Sept. 30, 1952      A. H. MIRAU      2,612,074

INTERFEROMETER

Filed March 27, 1950      2 SHEETS—SHEET 1

INVENTOR
ANDRE HENRI MIRAU,
BY
ATTORNEY

Sept. 30, 1952 — A. H. MIRAU — 2,612,074
INTERFEROMETER
Filed March 27, 1950 — 2 SHEETS—SHEET 2

INVENTOR
ANDRE HENRI MIRAU,
BY
ATTORNEY

Patented Sept. 30, 1952

2,612,074

UNITED STATES PATENT OFFICE 2,612,074

INTERFEROMETER

André Henri Mirau, Paris, France, assignor to Society "La Precision Mecanique," Paris, France, a society of the Republic of France Application March 27, 1950, Serial No. 152,151
In France March 30, 1949

9 Claims. (Cl. 88—14)

The present invention relates to interferometers and other measurement apparatus (for instance for studying superficial polish or the refractive index of transparent liquids or solids), based upon interference method measurement of differences of optical paths. My invention consists, chiefly, in separating light into two beams by means of a separator including a semi-reflecting layer, in combination with at least one mirror or other optical device capable of giving said beams, on their way to the viewing system, two substantially equal optical paths, producing the phenomenon of interference.

Other features of my invention will appear in the following detailed description of specific embodiments thereof, with reference to the accompanying drawings, given by way of example, and in which.

Figure 4:
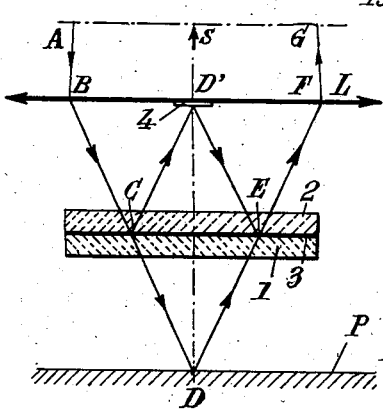
Fig. 4 is a diagram illustrating the optical operation of the system.
Figure 5:
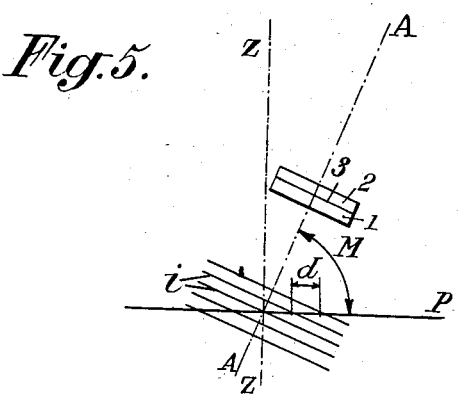
Figure 6:
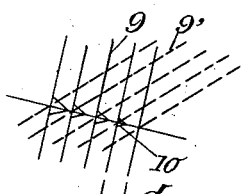
Figure 7:
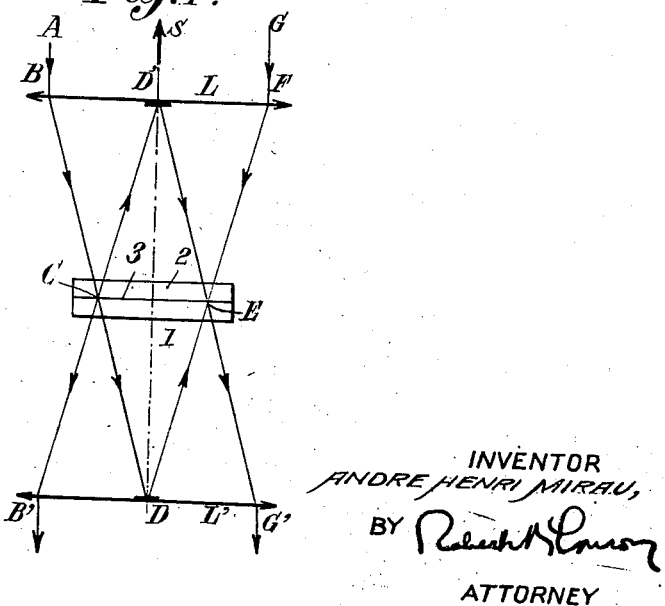

Figs. 5 and 6 diagrammatically show, in elevational view and in plan view, angular displacements of the optical axis of the apparatus;

Fig. 7 is a diagram analogous to that of Fig. 4, relating to another embodiment of the invention.

According to my invention, I interpose, across the path of light rays travelling from a suitable light source to a viewing device after passing through or impinging on the medium to be studied, a separator device essentially constituted by at least one semi-transparent thin layer capable, in combination with at least one mirror or other optical device, of dividing the light beam into two portions having substantially equal optical paths and giving thus rise to interferences.

This separator is constituted in particular by two transparent plates 1, 2 (Figs. 2 and 4) of suitable thicknesses, either equal or not, having for instance plane faces, preferably parallel and polished, at least one of these plates carrying the above mentioned thin layer 3 on the surface thereof which faces the other plate, this layer being constituted for instance by a metallic deposit as well known in this art.

If it is desired for instance to examine, through a viewing optical system diagrammatically represented on Fig. 4 by a lens L, the surface of a piece P illuminated by a source S supposed to be located on the same side as the viewing system, separator 3 is combined with a reference surface or mirror 4, disposed on the same side as lens L, for instance on said lens, and arranged in such manner as to stop but a small portion of the incident beam. This mirror, however, will be of sufficient area to avoid transmission of parasitic rays toward the viewing system.

For practical purposes, if it is desired to provide a microinterferometer intended either to determine the position of a polished surface or to study the superficial polish thereof, the lens L of Fig. 4 will be replaced by a microscope objective 5 (Fig. 2) in combination with a light source S disposed at any suitable point of the apparatus, for instance arranged in the same manner as in metallographic devices of the usual type, that is to say disposed for instance laterally to the frame 6 of the apparatus (Fig. 1), with a semi-transparent plate 7 or a total reflection prism or any other device permitting transmission of a light beam toward the object to be illuminated, without interfering with vision through the eye-piece 8 of the apparatus. The useful light beam is defined by the objective pupil on the side of the object and the field of the microscope. This field is, for most microscopes, relatively small as compared with the dimensions of the objective lenses.

Mirror 4 may be constituted for instance, either by a metallic deposit formed on the surface of the objective front lens (Fig. 2), or by a small metallic pellet, of plane, spherical, cylindrical or other shape, which pellet may be either glued or not on the surface of said objective and may be either removable or not with respect to the remainder of the apparatus. When use is made of a metallic deposit on the surface of the objective, this deposit may consist of vaporized aluminium; it suffices to place on this surface, during the vaporizing of aluminium, a protection element which makes it possible to deposit metal only inside a small circle centered on the objective axis and of a diameter substantially equal to the field of the microscope.

Such an apparatus, including the essential elements which have just been described, together with means for locating the separator and the objective with respect to piece in suitable and preferably adjustable relative positions, works as diagrammatically illustrated by Fig. 4.

Considering on this Fig. 4 the incident beam coming from direction A, or, for the sake of simplicity, elementary ray AB, it will be seen that this beam is divided into two portions along the two following paths: ABCDEFG on the one hand, with a passage through the separator, a reflection on piece P, another passage through the separator and return to the objective, that is to say to the viewing device, and ABCD'EFG on the other hand, with successive reflections on the separator and on mirror 4, and also return to the viewing device.

If both of the beams travel along equal optical paths, in examining a piece P supposed to have a perfectly plain and polished surface, which equal optical paths can be obtained through a suitable adjustment of the relative positions of the elements, any small inequalities in the surface of P produce interference fringes which are observed through the eye-piece on the surface that is being examined and follow all the details thereof as visible for instance at 9 on Fig. 6, unequalities resulting in corresponding unequalities 10 in said fringes.

It is therefore possible, by means of such an apparatus, to examine and to measure the finish of surfaces.

But such an apparatus also makes it possible to determine, with a high precision and without material contact, the relative position of a polished surface, or even to define the direction of this surface, by imparting the necessary movement to one of the elements the position and direction of which define the interference phenomenon.

Thus, according to a preferred feature of my invention, the apparatus makes it possible to modify at will the direction of the incident beam or of the optical axis of the apparatus with respect to the surface or object to be studied, or inversely. Figs. 5 and 6 diagrammatically show, in this respect, that variation of the angle M between optical axis A—A and surface P involves a variation of the distance $d$ between fringes (which are the intersection with surface P of the interference plane shown on a greatly enlarged scale on Fig. 5). Likewise, if axis A—A is rotated in space about a vertical axis Z—Z, the direction of the fringes varies. They assume for instance the new direction indicated in dotted lines at 9' (on these dotted lines and in order not to complicate the drawing, notches 10 are not shown). Therefore by displacing the optical axis, the operator gets new possibilities of examination and measurement.

Figure 1:
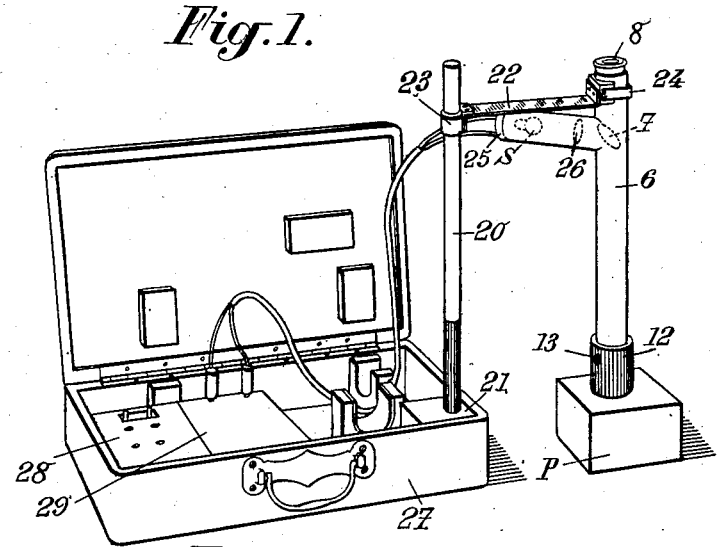
Fig. 1 is a perspective view of an interferometer made according to my invention.
Figure 2:
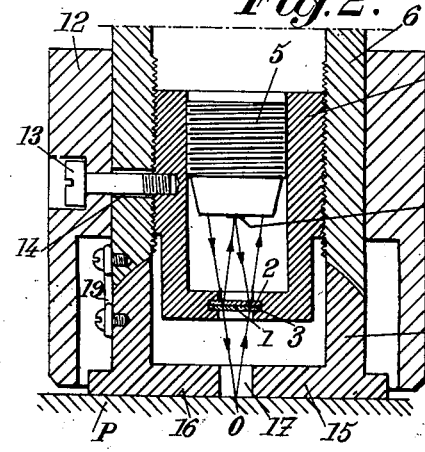
Figs. 2 and 3 are views on a larger scale showing respectively in partial axial section and side view, with parts cut away, certain parts of this apparatus.
Figure 3:
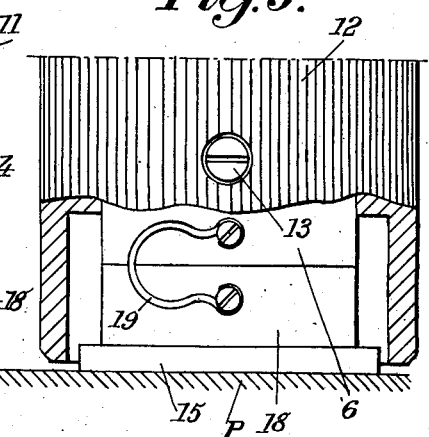

I will now describe the embodiment of Figs. 1 to 3, which makes it possible both to adjust the objective along its axis and to vary the direction thereof.

According to this embodiment (Figs. 1 to 3), the objective 5 is screwed in a piece 11 which supports, at the base thereof, separator 1—2—3, this screwing assembly making it possible to achieve a preliminary focussing of the objective on mirror 4, by reflection on the semi-transparent layer 3 of the separator. Piece 11 in turn is screwed in the frame 6 of the apparatus, with means for controlling from the outside the relative rotation of these two parts, which means may consist of a sleeve 12 surrounding the lower part of cylindrical frame 6 and connected with piece 11 through a screw 13 extending through a slot 14 of the frame. By operating this sleeve 12, the objective can be focussed on the piece P to be studied, opposite which the whole of the apparatus is positioned through means which will now be described.

In order to determine the operating position or positions of the apparatus with respect to the piece or object to be examined, I make use, in the embodiment illustrated by the drawing, of a swivel mounting including a base 15 adapted to be brought, for instance through a plane face 16, into contact or close to piece P, with at least one hole 17 for the passage of the light beam, this base including a spherical portion 18 the center O of which is for instance in plane 16 and inside hole 17, and on which can rest the lower surface, also of spherical shape, of frame 6. Advantageously, in order to make it possible for frame 6 to support swivel base 15, I provide between them a spring connection 19 which does not prevent relative angular displacements thereof.

Thus, the frame 6 of the apparatus can be given any desired displacements, for instance of relatively small amplitude about any axis passing through center O, which displacements make it possible, the fringes being visible at the center of the field, of modifying at will their spacing and their direction, according to the type of surface that is studied, without substantial displacement thereof in the field. The smoothness of this adjustment makes it unnecessary to use the slow movements usually applied in the art of interferometry.

A connection should also be provided between the apparatus and the fixed support, such as a column 20 on pedestal 21, this connection being such that it allows for displacements of the apparatus about center O and also makes it possible to displace base 15, in particular according to the dimensions of the pieces or objects to be examined.

Such a connection will preferably supply three degrees of freedom and will be obtained for instance: either by means of a swivel arm, or, in a simple manner, as shown by the drawing, by means of an elastic arm, constituted by a spring leaf 22 fixed in a removable manner and adjustable in height, at 23, 24, respectively on column 30 and frame 6.

The device illustrated by the drawing makes it possible both to move the swivel slightly on the piece and to vary the direction of the optical axis N—N of apparatus 6; it is therefore possible to adjust at will the direction and spacing of the fringes in a very simple manner. Furthermore, the setting in position is instantaneous, whatever be the thickness of the pieces to be examined, which involves very quick control.

The invention is still concerned with certain features relating to the illumination by means of source S.

First, it is of interest to place this source, as visible on Fig. 1, at the upper part of the apparatus, that is to say of tube 6, which reduces the space occupied by the head of the apparatus. Said source is mounted in a side tube 25, with its lens 26.

Furthermore, advantageously, this side tube 25, for instance mounted with sliding fit in its housing, is made of the same diameter as that of the eye-piece carrier and interchangeable therewith. It is then possible to make use either of the arrangement shown or of one according to which the light source would be disposed at the top of tube 6 and eye-piece 8 laterally, both devices cooperating in both cases with semi-transparent mirror 7 or any other equivalent means.

Finally, the apparatus is supplied in a case or chest 27 which may have several functions, for instance: to house the apparatus, to supply electric current, for instance, either by means of a transformer 28 for a stationary installation, or by means of a pocket battery 29, for displacements, to house the fixation system including pedestal 21 and column 20.

The above considered application of the apparatus to the measurement of superficial states is in no way limitative. Apparatus of this kind might be used for checking up the constancy of the refractive index of a transparent liquid or for measuring the difference between this index and that of a reference medium. It suffices for this purpose to interpose between the objective and the separator system the reference fluid and to pass the fluid to be studied between the separator system and surface P, Fig. 4. A variation of the index will be disclosed by a displacement of the interference fringes, easy to measure and which permits of calculating said variation.

Likewise, my invention may be applied to the observation of transparent matters and for instance of biological preparations. It suffices for this purpose to dispose the preparation to be examined on a perfectly polished metallic surface; discontinuities in the interference fringes will then be due to differences in the refractive indexes of the substances through which the light passes and will then disclose details which are not obtained with the usual methods, if light absorption by the substances that are examined is uniform.

It should further be understood that the optical diagram of Fig. 4 is in no way limitative and that the relative positions of the incident and reflected beams, same as those of the optical devices and of the separator, might be different. Thus I might, in some cases, and in particular when it is desired to determine the refractive index of transparent bodies, combine with the same separator two optical systems or objectives such as LL' (Fig. 7) with two mirrors or reference surfaces DD'.

An incident ray arriving at AB through objective L can be divided into two rays having, as their optical paths ABCD'EG' and ABCDEG', these two rays being then observed in objective L'.

One of the objectives, L, can therefore serve merely for illumination, and the other one, L', for observation. But observation might also take place concurrently on both sides, respectively through objectives L and L'.

My apparatus has many advantages, in particular greater simplicity, higher precision and greater facility of handling.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for studying by interference of light a surface to be tested which comprises, in combination, a light source, lens means for concentrating light rays from said source into a beam converging on said surface, a single partly reflecting and partly transparent element disposed on the other side of said lens means from said source across the light beam issuing from said lens for dividing it into two elementary beams, a mirror located between said dividing element and said lens means having its reflecting face turned toward said element for equalizing the optical paths of the elementary beam reflected on said element and of that passing through said element reflecting on said surface to be tested and passing back through said element, said mirror and said dividing element extending across the optical axis of said lens perpendicularly thereto, and a viewing device arranged to receive both of the elementary beams leaving said dividing element.

2. An apparatus according to claim 1 in which said mirror is carried by the external surface of the lens means.

3. An apparatus according to claim 1 in which said viewing means are located on the same side of said dividing element as said source.

4. An apparatus according to claim 1 including a frame, a sleeve supporting said dividing element mounted in an adjustable manner in said frame and means for mounting said lens means in an adjustable manner in said sleeve.

5. An apparatus according to claim 1 including a frame, said light source being carried by said frame laterally with respect to said lens means.

6. An apparatus according to claim 1 including a frame having a vertical tube with a side branch, and tubular elements for holding said light source and said lens means interchangeably engaging said tube and said side branch.

7. An apparatus according to claim 1 including a frame, a foot for said frame adapted to be placed on a piece to be examined, and swivel means for connecting said foot with said frame.

8. An apparatus according to claim 1 further including a base adapted to rest on the surface to be tested, a frame for holding said dividing element and said mirror, and means for interconnecting said frame with said base with three different degrees of freedom.

9. An apparatus according to claim 1 further including a base adapted to rest on the surface to be tested, a frame for holding said dividing element and said mirror and a spring arm for interconnecting said frame with said base.

ANDRÉ HENRI MIRAU.

REFERENCES CITED

The following references are of record in the file of this patent:

UNITED STATES PATENTS

| Number | Name | Date |
|---|---|---|
| 1,724,527 | Spierer | Aug. 13, 1929 |
| 2,151,631 | Williams | Mar. 21, 1939 |
| 2,472,991 | Sukumlyn | June 14, 1949 |

FOREIGN PATENTS

| Number | Country | Date |
|---|---|---|
| 443,184 | Great Britain | Feb. 24, 1936 |
| 569,046 | Great Britain | May 2, 1945 |
| 602,459 | Great Britain | May 27, 1948 |

OTHER REFERENCES

"Interference Microscope For Testing Surfaces"; published in Industrial Diamond Review, vol. 6, September 1946, pages 276–279. Copy in U. S. Patent Office Library.